United States Patent [19]
White et al.

[11] Patent Number: 5,054,839
[45] Date of Patent: Oct. 8, 1991

[54] VEHICULAR SUN VISOR ASSEMBLY

[76] Inventors: Jay E. White, 4079 Willoway Pl., Bloomfield Hills, Mich. 48013; Jay R. White, 4388 Lehigh Dr., Troy, Mich. 48098

[21] Appl. No.: 576,357

[22] Filed: Aug. 31, 1990

[51] Int. Cl.⁵ .............................................. B60J 3/02
[52] U.S. Cl. ................... 296/97.1; 296/97.12; 362/142
[58] Field of Search .................. 296/97.1, 97.9, 97.12; 362/142, 135

[56] References Cited

U.S. PATENT DOCUMENTS

| | | | |
|---|---|---|---|
| 3,926,470 | 12/1975 | Marcus | 296/97.1 |
| 4,000,404 | 12/1976 | Marcus | 296/97.1 |
| 4,070,054 | 1/1978 | Cziptschirsch | 296/97.9 |
| 4,075,468 | 4/1978 | Marcus | 296/97.1 |
| 4,213,169 | 7/1980 | Kempkers | 296/97.1 |
| 4,227,242 | 10/1980 | Marcus | 362/61 |
| 4,352,518 | 10/1982 | Prince et al. | 296/97.1 |
| 4,390,202 | 6/1983 | Flowerday et al. | 296/97.9 |
| 4,421,355 | 12/1983 | Marcus | 296/97.1 |
| 4,428,612 | 1/1984 | Viertel et al. | 296/97.12 |
| 4,458,938 | 7/1984 | Viertel et al. | 296/97.1 |
| 4,486,819 | 12/1984 | Marcus et al. | 362/142 |
| 4,491,899 | 1/1985 | Fleming | 296/97 |
| 4,494,789 | 1/1985 | Flowerday | 362/74 |
| 4,500,131 | 2/1985 | Fleming | 296/97.9 |
| 4,570,990 | 2/1986 | Flowerday | 296/97.1 |
| 4,586,788 | 5/1986 | Hansen | 350/283 |
| 4,648,011 | 3/1987 | Boote et al. | 362/135 |
| 4,653,798 | 3/1987 | White et al. | 296/97.1 |
| 4,734,831 | 3/1988 | Keyser et al. | 362/74 |
| 4,744,645 | 5/1988 | Sharp | 350/631 |
| 4,760,503 | 7/1988 | VandenBerge et al. | 362/135 |
| 4,762,359 | 8/1988 | Boerema et al. | 296/97.9 |

Primary Examiner—Robert R. Song
Attorney, Agent, or Firm—Gifford, Groh, Sprinkle, Patmore and Anderson

[57] ABSTRACT

A lighted mirror sun visor assembly including a molded plastic base core member and a molded plastic cover core member. The exterior surface of the core members are covered with an upholstery material. The pivot rod, visor storage position spring, lighting circuit including lamps, mirror and sliding door are all preloaded into the base core member. Finally the cover core member is snapped locked to the base core member and the upholstery material is permanently held in place by separate retention means creating a unique seam with an overall aesthetic appearance.

15 Claims, 4 Drawing Sheets

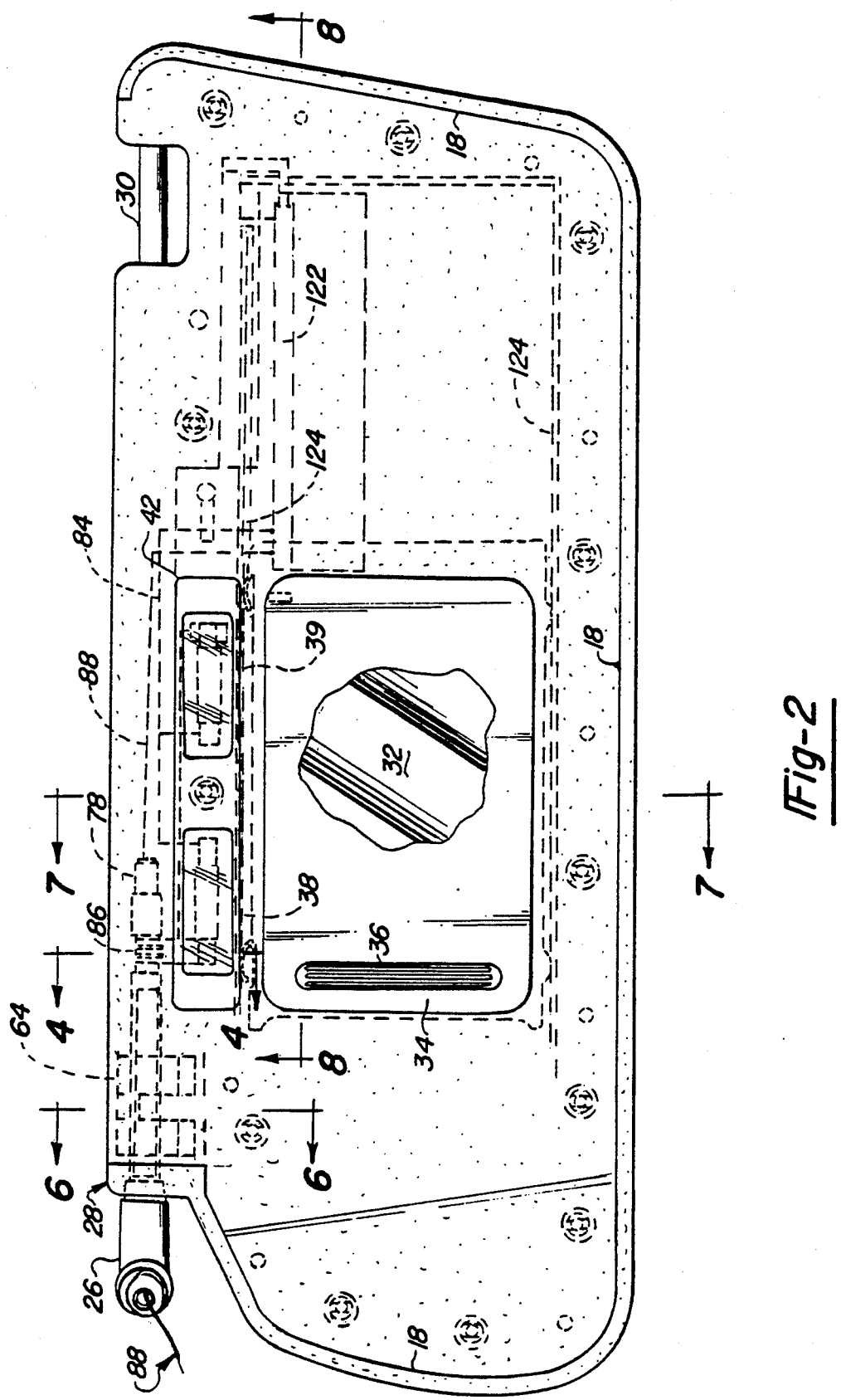

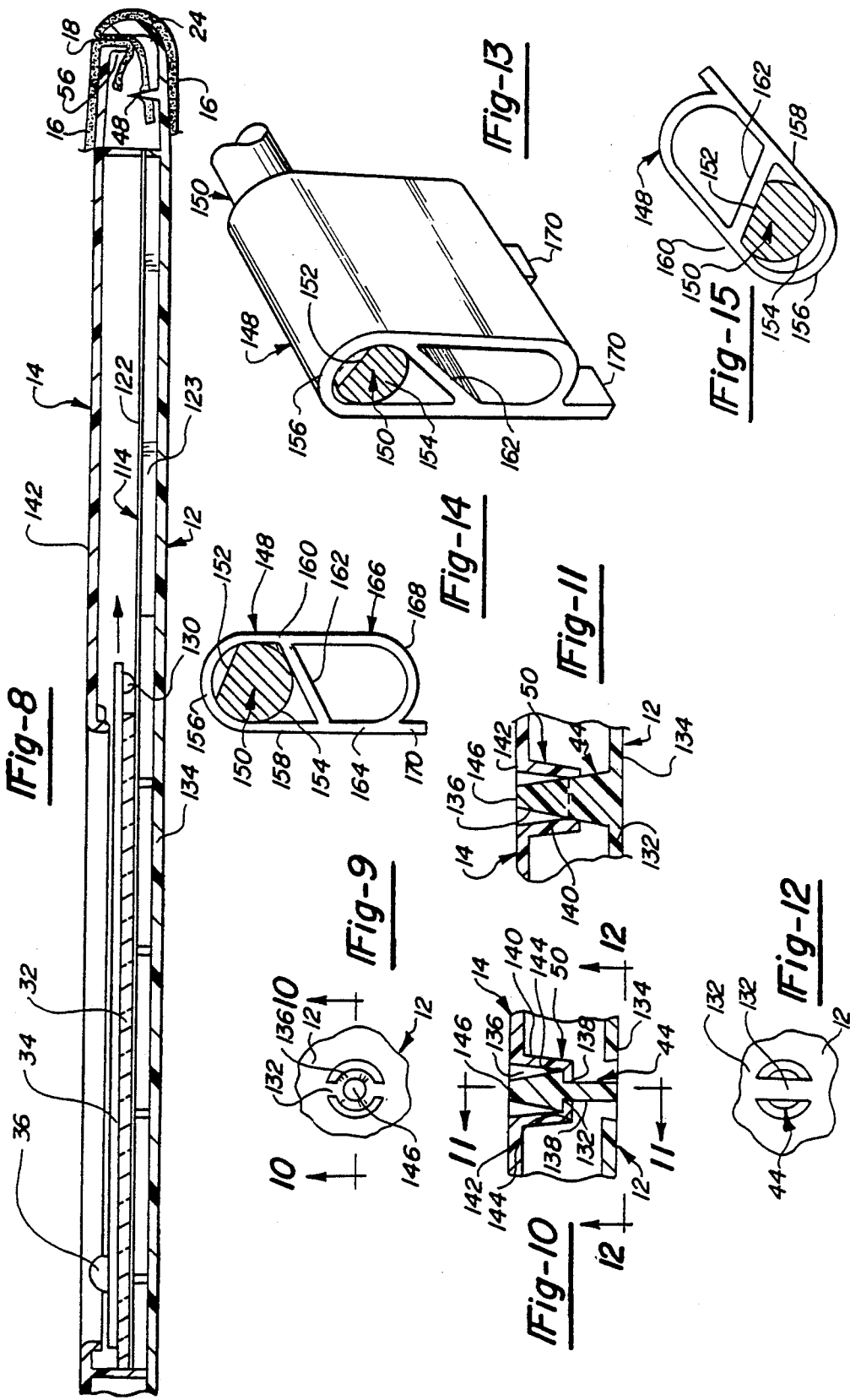

VEHICULAR SUN VISOR ASSEMBLY

BACKGROUND OF THE INVENTION

1. Field of the Invention

This invention relates to vehicular sun visors, and, more particularly, this invention relates to sun visors having a lighted vanity mirror with a door that may be moved from a closed position covering the mirror to an open position exposing the mirror for use.

2. Description of the Prior Art

Typically a sun visor has been constructed with a hardboard core which is covered with a plastic foam or other suitable padding material which in turn is covered with an upholstery layer. With this design, metal fixtures must be riveted or otherwise attached to the hardboard to form a socket, and a torque spring structure is mounted in the socket for maintaining the visor in its storage position when not in use. If the visor is equipped with a vanity mirror, the hardboard core member is cut out to receive the mirror. The mirror may have a cover which is pivoted between a closed position covering the mirror and an open position extending outwardly towards the users head which presents a safety hazard.

More recently, the visor assemblies have been constructed with molded plastic core members. Typically these are molded with two halves joined by a living hinge. This structure is commonly referred to as a clam shell. The internal members are inserted in the molded core members, and a covering or upholstery material is applied to the exterior of the core halves. The core halves are then pressed together and usually bonded by a heat sealing or a melting operation. Like the hardboard core visor, when a vanity mirror is to be supplied, it is inserted in a recess in one of the core members, and if a door is used to cover the mirror, it is of the hinged type swinging between a closed position covering the mirror and an open position extending towards the user.

When lighting is supplied to aid in the use of the mirror, a lamp structure is supplied at one or both ends of the mirror. In some instances the lighting has been provided by a lamp at one end of the mirror with suitable light conducting members conducting the light to the other end of the mirror.

In meeting the need for an aesthetically enhanced appearance and an improved safety oriented structure for both the hardboard core and molded core structures, a sun visor mirror assembly was introduced according to the teaching of our U.S. Pat. No. 4,653,798. This assembly includes the vanity mirror and a frame structure which allows a door to be slid within the visor assembly structure from a closed position covering the mirror to an open position exposing the mirror for use.

With a trend toward structurally improved molded visor assemblies, we introduced a molded visor in which the mirror assembly of U.S. Pat. No. 4,653,798 could be inserted or alternatively, the molded visor is self contained with a mirror and a sliding door. This improved visor structure is shown in our U.S. Pat. No. 4,858,983.

In the various sun visor structures, the seam created by covering the visor with upholstery material has generally been allowed to fall at the mid point of the visor thickness so that it is clearly visible in the visor storage position.

SUMMARY OF THE INVENTION

In a preferred embodiment of the invention the sun visor assembly includes a molded plastic base core member and a molded plastic cover core member. The core members are locked together in face to face alignment by the engagement of rigid pins extending inwardly adjacent the perimeter of one of the core members in snap-in engagement with sockets extending inwardly around the perimeter of the other core member.

The base core member has a rounded leading edge which faces the passenger compartment of a vehicle when the visor assembly is located in its storage position facing the vehicle roof. The leading edge is also the bottom of the visor in its downward use position. Upholstery material covers the outside of the base core member and is wrapped around the leading edge to extend into the visor assembly when the core members have been locked together so as to form a seam facing towards the cover member and towards the vehicle roof when the visor is located in the storage position. The fabric is retained on the visor assembly independently of the locking means for holding the core members together.

In some instances, the cover core member can be provided with a textured appearance in its molding process so that it is left uncovered. More often the cover core member is also covered with upholstery material so that it also extends into the visor assembly at the seam. The upholstery material may be a single piece covering both the base core member and the cover core member so that the only seam will face the cover core member. In other instances, the upholstery material will be separate pieces for the base core member and the cover core member. This creates a second seam along the top of the visor which is not visible in either the use position or in the storage position of the visor assembly. In most instances the cover core member has an opening to provide access to a vanity mirror.

The rounded leading edge of the base core member forms an inwardly directed peripheral wall at least along the bottom of the base core member. The cover core member has an inwardly directed peripheral wall at least along the one longitudinal side which fits inside the peripheral wall of the base core member with the upholstery material therebetween. The coaction of the peripheral walls forms the means for retaining the upholstery material on the visor assembly. When the cover core member is covered with upholstery material this material is squeezed with the material from the base core member between the peripheral walls of the cover core member and base core member to retain the upholstery material on the visor assembly and to form the seam which faces towards the cover core member and toward the roof of the vehicle when the visor assembly is in its storage position.

In a preferred form of the invention the base core member not only has a rounded bottom peripheral wall but it also has rounded side peripheral walls which blend into the rounded bottom peripheral wall. Likewise the cover core member has side peripheral walls which extend inwardly. Upholstery material covering the exterior of the base core member is wrapped around the rounded bottom longitudinal wall and the side rounded peripheral walls and is held between the peripheral bottom and peripheral side walls of the base core member and the cover core member forming a seam which faces the cover core member and the vehicle roof when the visor is located in its storage position facing the vehicle roof. Likewise when the cover core member is covered with upholstery material it is held with the upholstery material covering the base core member between the bottom peripheral walls and the side peripheral walls of the base core member and the cover core member which acts to retain the upholstery material much in the fashion of an embroidery hoop.

The molded base core member has a socket molded at one corner to receive a torque spring and a pivot rod. The torque spring surrounds the pivot rod and is preloaded to hold the visor assembly in its storage position. A circuit board is mounted in the base core member. This circuit board has a switch which is integral with the board and is part of the lighting circuit contained on the board. A vanity mirror is mounted in the base core member, and in its preferred form it is adhesively bonded to a portion of the circuit board. A sliding door is mounted in longitudinal extending guides molded in the base core member for sliding movement from a closed position covering the mirror to an open position exposing the mirror for use. In the closed position the door is concealed within the visor assembly. The door has a switching element which contacts the switch to close it as the door is moved from its closed position to its open position. Lamps are connected with the lighting circuit and are provided with lenses for directing the light from the lamps towards the object to be observed in the mirror.

In another aspect of the invention, the pivot rod is formed of a plastic material with a metal tube insert molded at its center. The metal tube forms one of the input power leads to the lighting circuit, and a wire inside the tube forms the other input power lead to the lighting circuit. The molded plastic provides a good bearing surface for coaction with complementary bearing surfaces in the visor socket. A portion of the plastic is cut away to provide an opening for a spring loaded contact which forms a switch in the lighting circuit. The spring loaded contact is insulated by the plastic when the visor is swung to its storage position adjacent to the vehicle roof.

The switch on the circuit board is a pressure switch extends substantially the length of the door in the closed position of the door. A switching element on the door in the form of a rib makes contact with the switch on the circuit board upon initial sliding of the door from its closed position so as to maintain a continuous moving contact during the sliding of the door from its closed position to its open position. This switch can be a resistance element which forms a part of the switching circuit so as to cause an increase in brightness of the lamps as the door is moved from its closed position toward its open position. The brightness would decrease as the door is moved from its open position to its closed position.

In a preferred form of the invention, the torque spring is generally U-shaped having a first opposed leg with a portion adjacent the bight of the U conforming to the generally cylindrical surface of the pivot rod. The second opposed leg of the spring has a planar surface conforming to a planar detent surface on the pivot rod. Each of the legs have a terminal free end which is restrained by separate ledge portion of the base core member to create a preloading force which tends to retain the visor assembly in its storage position. Both legs are bifurcated adjacent their free ends so that a post portion of the base core member is located in the bifurcation to retain the spring in the base core member.

In another preferred form of the invention, the torque spring is molded in a resilient plastic having a pivot rod receiving closed perimeter, a portion of which conforms to the generally cylindrical portion of the pivot rod and another portion of which includes a flat planar surface which conforms to a planar detent surface on the pivot rod. This spring is held in the base core member by one or more tab members. The flat planar surface is generally opposed to the cylindrical surface with spaced parallel leg members tangentially joining a semicircular portion of the cylindrical surface to the two ends of the planar surfaces at a skewed position to form an obtuse angle at one end and an acute angle at the other end completing the closed perimeter of the spring. The wedging action between the cylindrical and planar portions of the pivot rod with the cylindrical, flat planar surface and leg portions of the closed perimeter produces a preloaded force keeping the visor assembly in the position to which it is pivoted and urging the visor into its storage position as it is being pivoted to this position. This force retains the visor in the storage position with the flat planar surface of the spring in contact with the planar detent surface on the pivot rod.

Another feature of the present invention is the location of the lamps above the mirror and covering door so as to provide more uniform lighting and maximize the size of the mirror.

DRAWING

The preferred embodiments of the invention are illustrated in the drawing in which:

FIG. 2 is a plan view of the visor assembly of this invention with a portion broken away to show the vanity mirror;

Figure 7:
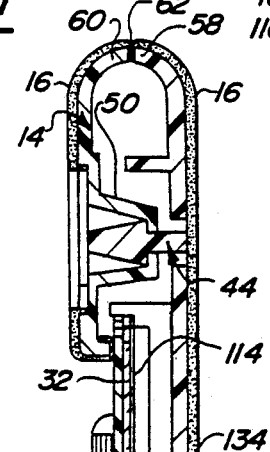

FIG. 7 is a cross-sectional view of the visor assembly of this invention taken along line 7—7 of FIG. 2 showing the retention of the upholstery material between the rounded bottom wall of the base core member and the peripheral bottom wall of the cover core member. Additionally, the relationship of the various parts as they are assembled in the base core member is shown with a preferred form of the pin and socket locking mechanism between the base core member and the cover core member;

FIG. 8 is a partial cross-sectional view taken along line 8—8 of the visor assembly showing a preferred form of retaining the upholstery material covering the base core member and cover core member between the peripheral walls of these core members;

FIG. 9 is a fragmentary plan view showing the locking pin as it is integrally molded with the base core member;

FIG. 10 is a elevational cross-sectional view taken along line 10—10 of FIG. 9 showing the locking pin of the base core member engaged in a socket of the cover core member;

FIG. 11 is a partial cross-sectional view taken along line 11—11 of FIG. 10 showing the locking pin of the base core member engaged in the socket of the cover core member;

FIG. 12 is a fragmentary plan view showing the locking pin integrally molded with the flat exterior surface of the base core member;

FIG. 13 is a perspective view of an alternate embodiment of the torque spring of this invention showing the spring as a molded resilient plastic having a closed perimeter portion which engages the pivot rod to hold the visor assembly in its use position;

FIG. 14 is a plan view of the plastic spring and the pivot rod as they are oriented to hold the visor in its use position; and FIG. 15 is a plan view similar to FIG. 14 of the plastic spring and the pivot rod as they are oriented to hold the visor in its storage position adjacent the vehicle roof.

DETAILED DESCRIPTION OF THE PREFERRED EMBODIMENTS OF THE INVENTION

Figure 1:
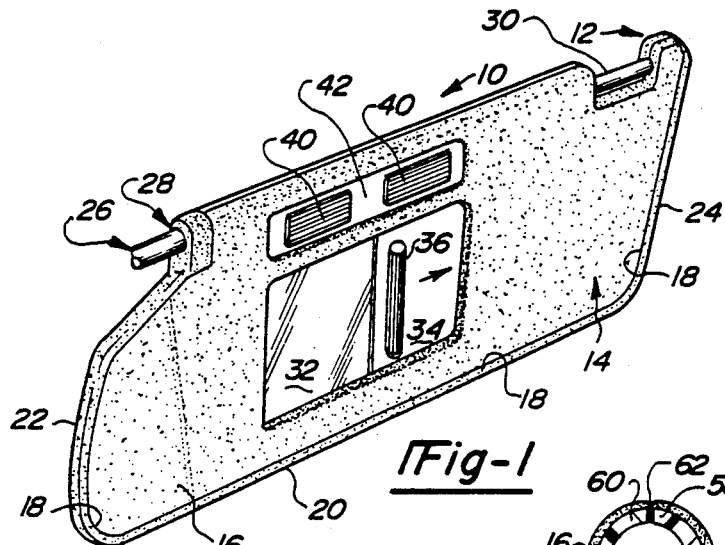
FIG. 1 is a perspective view of the sun visor assembly of this invention showing the upholstery covering, a vanity mirror with a sliding access door and bezel mounted lenses for directing lamp illumination for the mirror.

Referring to FIG. 1, the sun visor assembly 10 is shown as including a base core member 12 and a cover core member 14 covered by upholstery material 16 which has been stretched around the rounded bottom wall 20 or leading edge of the visor assembly when it is in its storage position adjacent the roof of the vehicle and stretched around the rounded sides 22 and 24 to form a retaining seam 18 which faces the cover core member and the vehicle roof when the visor assembly is in its storage position. The visor assembly 10 includes a pivot rod 26, partially shown in FIG. 1, inserted in socket 28, and a fixed position rod 30. A vanity mirror 32 is contained within the base core member which is uncovered for use when the sliding door 34 has been moved in the direction of the arrow by pushing against handle 36 moving the door to its open position. Sliding the door in the opposite direction to its closed position completely covers the mirror. Illumination of the object to be viewed in the mirror is obtained by lamps or bulbs 38 and 39 shown in FIG. 3 which is directed by lenses 40 retained by bezel 42.

Figure 3:
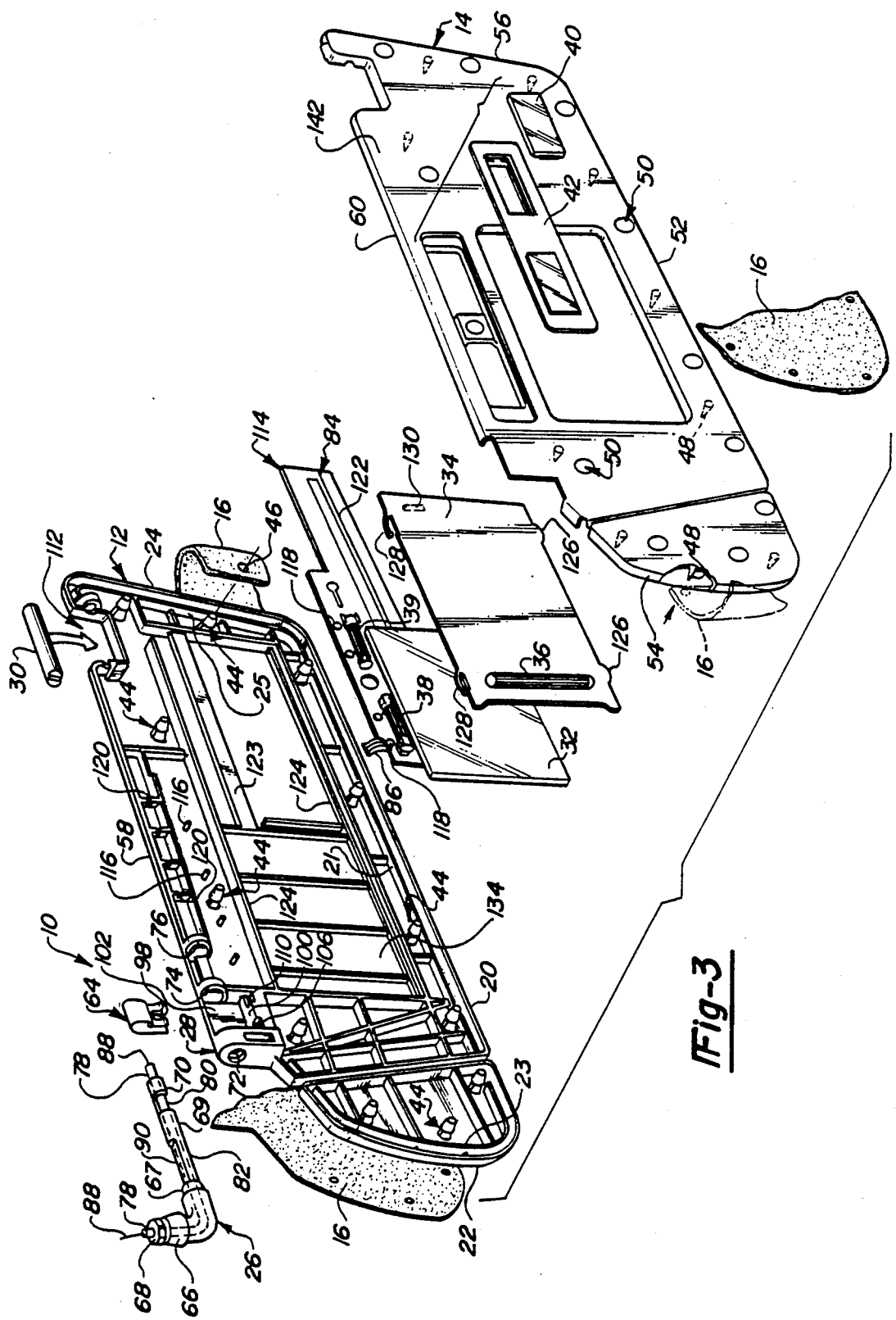
FIG. 3 is a exploded view of a preferred embodiment of the invention showing the molded plastic base core member with its pivot rod and torque spring to be located therein along with a printed lighting circuit, mirror and sliding door, and a molded plastic cover core member which snap-locks to the base core member with upholstery material covering the completed visor assembly.

Referring to FIGS. 3 and 8, the upholstery material 16 can be temporarily held on the cover core member 14 and the base core member 12 by pushing the edge of the fabric over the pins 48. The upholstery material 16 has been pierced to slide over the pin. Alternatively, the material can be glued to the inside of the base core member or temporarily retained by locking pins 44, shown best at the bottom of FIG. 7. When the cover core member 14 has been locked to the base core member 12 by locking pins 44 on the base core member having been snapped into sockets 50 on the cover core member, as will be explained with reference to FIGS. 7, and 9-12. The upholstery material 16 is permanently retained by the coaction of the inside of bottom peripheral wall 20 on the base core member and the bottom peripheral wall 52 of the cover core member 14 which fits inside of the bottom peripheral wall 20 of the base core member. Likewise the material is permanently retained along the side walls of the visor between the inside of rounded sides 22 and 24 on the base core member and the peripheral side walls 54 and 56 of the cover core member. The fabric or upholstery material 16 is pinched between the bottom wall 20 and side walls 22 and 24 of the base or core member and the bottom and side peripheral walls 52, 54 and 56 of the cover core member in the same manner as material is pinched between embroidery hoops; this is best seen at the right hand side of FIG. 8. This creates the seam 18 around the three sides of the visor as best seen in FIGS. 1 and 2. In some instances this upholstery fabric retention can be supplemented by providing a second, inner wall closely adjacent to the peripheral wall on the base core member as shown in FIG. 3 as inner bottom wall 21 and inner side walls 23 and 25. The upholstery material will be further retained in the channel between bottom base core member walls 20 and 21 with cover core member bottom wall 52 and in the channels between side walls 22 and 23 and sidewalls 24 and 25 on the base core by cover core member side walls 54 and 56 respectively.

Figure 6:
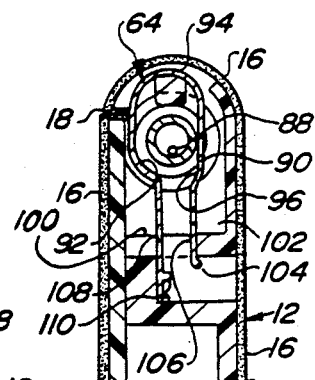
FIG. 6 is a fragmentary cross-sectional view of the visor assembly of the invention taken along line 6—6 of FIG. 2 showing the torque spring being retained in a preloaded condition in the base core member surrounding the pivot rod in position to retain the visor assembly in its storage position adjacent the vehicle roof.

Both the base core member 12 and the cover core member 14 have a straight top peripheral wall 58 and 60 respectively which abut against each other when the core members have been snapped together. If a single piece of fabric at 16 is used to cover both the base core member and the cover core member, the fabric will cover the line of juncture of the top walls as shown in FIG. 6. If separate pieces of fabric 16 are used, there will be a seam at the center of the top as shown at 62 in FIGS. 4, 5 and 7.

The pivot rod 26 alone and the pivot rod 26 in combination with torque spring 64 both provide considerable advantage over the prior art devices.

The pivot rod 26 serves its normal dual purpose of allowing the visor assembly 10 to be pivoted from its use position substantially vertical or tilted position towards the windshield, to its storage position, substantially parallel with the roof of the vehicle in which the visor is installed. Additionally the elbow tapered end 66 and lock flange 68 of the pivot rod allow the visor 10 to be swung in a bracket, not shown, from a windshield use position to a side window use position while retaining the pivot rod 26 against removal from its bracket. This is more fully explained in our U.S. Pat. No. 4,858,983.

Figure 4:
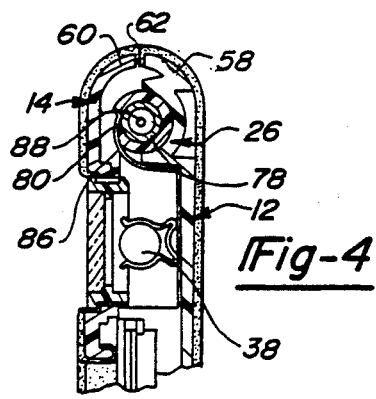
FIG. 4 is a fragmentary cross-sectional view taken along line 4—4 of FIG. 2 showing a spring loaded switching member in contact with the metal tube of the pivot rod to close a portion of the mirror lighting circuit when the visor is in its use position.
Figure 5:
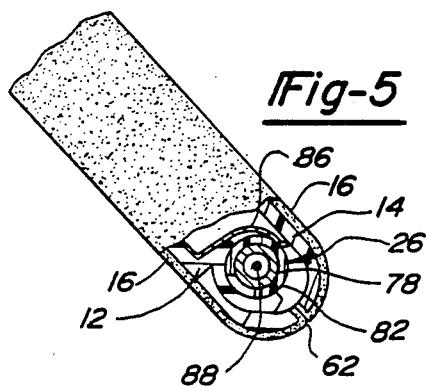
FIG. 5 is a fragmentary cross-sectional view similar to FIG. 4 but showing the visor pivoted to a position opening the switch in the lighting circuit as the switching element is insulated from the metal tube by the plastic body of the pivot rod.

Pivot rod 26 is considered to be an improvement over the solid metal rods previously used such as those shown in our U.S. Pat. No. 4,858,983 and shown in U.S. Pat. No. 4,791,537 because it is a molded plastic rod with a centrally located metal tube 78. The pivot rod 26 has spaced cylindrical bearing surfaces 67, 69 and 70 which cooperate with bearing surfaces 72, 74 and 76 respectively in base core socket 28. Preferably the rod is molded with nylon to provide lubricity and wear resistance. Metal tube 78 is insert molded within the plastic body of the pivot rod 26 having a window or exposed portion 80 along the shank 82 of the pivot rod 26. The metal tube 78 serves as one of the two input power leads to the lighting circuit 84. When the visor assembly 10 is pivoted to its use position, spring loaded contact 86 makes contact with the metal tube 78 at window 80 as shown in FIG. 4. When the visor 10 is swung into its storage position, the contact 86 will be insulated from the metal tube 78 by the plastic of the shank 82 as shown in FIG. 5. This allows the pivot rod to carry the two input power leads to a mirror lighting circuit 84 while performing a switching function in one of the leads and the plastic body provides good bearing support for the pivoting motion of the visor. Metal tube 78 is the ground or negative connection to the vehicle 12 volt electrical system. The other lead or positive input connection is made through the wire 88 which extends through the tube 78.

When the pivot rod 26 is received in socket 28, a generally U-shaped torque spring 64 surrounds a portion of the shank 82. The generally cylindrical shank 82 has a flattened planar surface 90. A generally U-shaped spring 64 has a curved portion 92 on one of the legs of the spring adjacent the bight 94 and a flattened portion 96 on the other leg of the U adjacent the bight 94 which coacts with the flattened planar surface 90 on the rod shank when the visor is in its storage position adjacent the roof of the vehicle which retains the visor in this position. This position of the spring is shown in FIG. 6. At least one of the legs and preferably both of the legs of the spring have a bifurcation 98 which receives a positioning post 100 as shown in FIG. 3. Spring 64 is positioned in the base core member 12 in cavity 102 with one of its legs 104 resting on ledge 106. The other leg 108 of the spring 64 is snapped under the ledge 110 which supplies a preloaded force to the spring for retaining the pivot rod in its storage position. The spring can be preloaded or snapped in position with the pivot rod 26 in place, of the spring may be snapped into position and the pivot rod 26 forced into the socket 28 through torque spring 64 after the spring is in place.

An alternative torque spring 148 of the present invention shown in FIGS. 13-15 is molded in resilient material with a generally oval shape to fit into socket cavity 102 of base core member 12, being held therein by tabs 170. It will be appreciated the plastic spring 148 could also be installed in a single core visor.

The pivot rod shank 150 is shown as a solid cylindrical metal rod, but it could be the preferred plastic pivot rod 26. Shank 150 is received in a pivot rod receiving closed perimeter, a portion 156 of which conforms to the generally cylindrical portion 154 of the pivot rod shank. Another portion of the perimeter includes a flat planar surface 162 which is opposed to the cylindrical surface at a skew angle. Cylindrical portion 156 occupies a full semicircular configuration with leg portions 158 and 160 tangentially joining the semicircular portion 156 and the ends of the flat planar surface 162. The skewed position of the wall 162 forms an obtuse angle at one end and an acute angle at the other end completing the rod receiving closed perimeter of the spring. The wedging action between the cylindrical portion 154 and the planar detent portion 152 of the pivot rod shank and the cylindrical portion 156, flat planar surface 162 and straight leg portions 158 and 160 produces a preloaded force which keeps the visor assembly in the position to which it has been pivoted. FIG. 14 shows the rod as it is positioned in its use position where the visor would be extending substantially vertically downward. As the visor is pivoted upwardly towards its storage position shown in FIG. 15 the wedging action will be increased to urge the visor into the storage position with the flat planar detent portion of the pivot rod 152 in contact with the planar surface 162 of the torque spring. To complete a structurally strong spring, the leg members 158 and 160 are extended beyond the flat planar wall 162 by straight wall portions 164 and 166 respectively to join the semicircular cylindrical portion 168 tangentially. Tabs 170 extend outwardly as an extension of the leg wall portion 164. An advantage of the plastic torque spring 148 over the metallic torque spring 64 is that the plastic spring develops its preloaded force merely by insertion of the pivot rod shank into the spring, and this force is not transmitted to the core member. With a metal spring, special fixturing must be used to flex the spring into its preloaded position in the core member, and this force is transmitted to the core structure.

In addition to the pivot rod 26 and torque spring 64 or 148, other major components of the visor assembly 10 are preassembled to the base core member 12. The positioning rod 30 is snapped into its socket shown generally at 112. The printed circuit board 114 containing the lighting circuit 84 and fixtures for the lamps 38 and 39 is inserted into the base core member 24 with the molded rivets 116 on the base core member 24 projecting through apertures 118 on the board. These rivets are melted over to retain the board in position. Wire 88 is lead through channels 120 in the base core member to be connected to the pressure switch 122 on board 114. Bulbs 38 and 39 are snapped into their sockets on the board 114.

The mirror 32 is inserted in the base core member 12. Preferably the mirror 32 or the circuit board 114 has adhesive backing to hold the mirror to the circuit board.

Next the sliding door 34 is inserted in the base core member 12 to slide in longitudinal guide members 124. Rounded projections 126 ride against one of the guide members 124 and molded spring projections 128 ride against the other guide member 124 holding the mirror spring loaded in place. The door 34 carries a switching element in the form of a rib 130 which contacts the pressure switch 122 as soon as the door 34 is slid from its closed position. Switching element 130 maintains this pressure switch in a closed position as it moves along the switch body 122 from the closed position to the fully opened position of the door. Base core member 12 has a longitudinally extending rib 123 which backs up switch 122 as the door rib presses against the switch. If desired, this switch 122 can take the form of a variable resistor so that the brightness or illumination intensity of the bulbs 38 and 39 increase as the door is being slid from its closed position to its open position.

The lamp lenses 40 are snapped into the bezel member 42 and the bezel member 42 is snapped into cover core member 14. Finally, the cover core member 14 is locked to the base core member by snapping the tapered locking pins 44 on the base core member into the sockets 50 on the cover core member.

As best seen in FIG. 7 and FIGS. 9-12, the pins 44 have a flat shank portion 132 which projects inwardly from the flat face 134 of the base core member 12 to a conical tang 136. The juncture of the planar shank 132 with the conical tang 136 provides parallel undercut surfaces 138. Generally tubular bosses 140 extend inwardly from the flat face 142 of the cover core member 14 to form the sockets 50. Each of the bosses 140 have opposed and parallel, inwardly directed, flanges 144 at their terminal ends. When the pin 44 is inserted in socket 50, the conical tang 136 temporarily deforms the flanges 144 so that the undercut surfaces 138 of the locking pins 44 snap over the fiances 144 of the sockets 50 to firmly lock the pin in the socket The conical tang 136 has a flat end 146 which is coplanar with the base or external surface 142 of the cover core member 14.

The lighting circuit for the visor shown schematically in FIG. 2 is simple, providing the 12 volt vehicle voltage in parallel to both bulbs 38 and 39. The negative ground connection through metal tube 78 and spring loaded wiper 86 is supplied to the left hand side of bulb 38 and the right hand side of bulb 39 as viewed in FIG. 2. The positive part of the circuit is brought in through wire 88 to pressure switch 122 and then to the right hand side of bulb 38 and the left hand side of bulb 39. Opening the door by sliding it to the right as viewed in FIG. 2 energizes the circuit when the visor is in its vertical use position. Should the door not be closed when the visor is moved into its storage position, the spring loaded contact or switch 86 will break the circuit by passing out of contact with the metal tube 78 and into contact with the plastic of the shank portion 82 of pivot rod 26.

The embodiments of the invention in which an exclusive property or privilege is claimed are defined as follows:

1. A vehicular sun visor assembly comprising:
   a molded plastic base core member;
   a molded plastic cover core member;
   means for locking said core members together in face to face alignment;
   said base core member having a rounded leading edge which faces the passenger compartment of a vehicle when the visor assembly is located in a storage position facing the vehicle roof, and said leading edge is the bottom of said visor assembly when the visor assembly is located in its downward use position;
   upholstery material covering the outside of said base core member, wrapped around said leading edge, and said upholstery material extending into said visor assembly when said core members have been locked together forming a seam facing towards said cover core member and towards the vehicle roof when said visor is located in the storage position; and
   retention means independent of said locking means for holding said upholstery material on said visor assembly.

2. The visor assembly according to claim 1 including upholstery material covering the outside of said cover core member and extending into said visor assembly at said seam.

3. The visor assembly according to claim 2 wherein the upholstery material covering said base core member and said cover core member is a single piece of material.

4. The visor assembly according to claim 2 wherein the upholstery material covering said base core member is separate from said upholstery material covering said cover core member.

5. The visor assembly according to claim 2 wherein said cover core member and the upholstery covering it have an opening to provide access to a vanity mirror.

6. The visor assembly according to claim 1 wherein the rounded leading edge of said base core member forms an inwardly directed peripheral wall at least along the bottom of said base core member, and said cover core member has an inwardly directed peripheral wall at least along the bottom side thereof, the peripheral wall of said cover core member fitting inside the peripheral wall of said base core member with said upholstery material therebetween, coaction of said peripheral walls forming at least a portion of said retention means, and, with said upholstery material, forming said seam.

7. The visor assembly according to claim 6 including upholstery material surrounding the outside of said cover core member and extending into said visor assembly with the upholstery material surrounding said base core member, said materials being squeezed between the peripheral walls of said cover core member and said base core member retaining said upholstery material on said visor assembly and forming said seam.

8. The visor assembly according to claim 7 wherein the inwardly directed peripheral wall on said base core member extends along the generally transverse sides of said base core member and the inwardly directed peripheral wall on said cover core member extends along the generally transverse sides of said cover core member so that the upholstery material surrounding said base core member and said cover core member is held between said peripheral walls along at least the bottom and two sides of said visor assembly.

9. A vehicular sun visor assembly comprising:
   a molded plastic base core member having a top longitudinally extending peripheral wall, a rounded bottom longitudinally extending peripheral wall, and rounded transverse side peripheral walls blending into said rounded bottom longitudinally extending peripheral wall, said base core member having a substantially uninterrupted exterior wall which faces in the general direction of the windshield in a use position of the visor assembly and said peripheral walls extending inwardly from said exterior wall around all four sides;
   a molded plastic cover core member having top and bottom longitudinally extending peripheral walls and transverse side peripheral walls, and an exterior wall which faces inwardly towards passenger compartment when the visor assembly is in said use position, said peripheral walls extending inwardly from said exterior wall around all four sides, and said bottom longitudinally extending peripheral wall and said transverse side peripheral walls of said cover core member fitting inside the bottom longitudinally extending peripheral wall and transverse side peripheral walls of said base core member;
   upholstery material covering the exterior wall of said base core member, wrapped around said rounded bottom longitudinal wall and said rounded transverse side walls extending into said visor assembly and being held between the peripheral bottom and peripheral transverse side walls on said base core member and said cover core member, forming a seam facing said cover core member and facing towards the vehicle roof when said visor is located in a storage position facing the vehicle roof.

10. The visor assembly according to claim 9 including upholstery material covering the exterior wall of said cover core member extending into said visor assembly at said seam being held with the upholstery material covering the exterior wall of said base core member between the bottom and side peripheral walls on said base core member and said cover core member.

11. The visor assembly according to claim 10 wherein the upholstery material covering the exterior wall of said base core member and the exterior wall of said cover member is held between the top peripheral walls of said base core member and said cover core member.

12. The visor assembly according to claim 11 wherein said cover core member and the upholstery material covering it have an opening to provide access to a vanity mirror.

13. A vehicular sun visor assembly comprising:
a core member;
a socket located in said core member, said socket having spaced apart bearing portions and a spring receiving cavity between said bearing portions;
a pivot rod having a cylindrical shank received in the bearing portions of said socket for pivoting said visor assembly between a storage position adjacent the vehicle roof and a substantially vertical use position, said pivot rod having a planar detent surface portion on the cylinder shank between said bearing portions; and
a torque spring which is generally U-shaped having a first opposed leg with a portion adjacent the bight of said U conforming to the cylindrical shank of said pivot rod and a second opposed leg with a planar surface conforming to the planar detent surface of said pivot rod, each of said legs having a terminal free end which is restrained by separate spaced ledges of said core member which force said opposed legs toward each other to create a preloading force which retains said visor assembly in a storage position adjacent the vehicle roof by the coation of the planar detent surface on the shank of said pivot rod with the planar surface on said torque spring.

14. A vehicular sun visor assembly comprising:
a core member;
a socket located in said core member, said socket having spaced apart bearing portions and a spring receiving cavity between said bearing portions;
a pivot rod having a cylindrical shank received in the bearing portions of said socket for pivoting said visor assembly between a storage position adjacent the vehicle roof and a substantially vertical use position, said pivot rod having a planar detent surface portion on the cylindrical shank between said bearing portions; and
a torque spring molded in a resilient plastic being retained in said core member and having a pivot rod receiving closed perimeter, a portion of which conforms to said cylindrical shank and another of which includes a planar surface which conforms to the planar detent surface on said shank which causes a wedging action between the pivot rod shank and said torque spring providing a preloaded force keeping the visor assembly in the position to which it is pivoted and, urging the visor into its storage position as it is being pivoted to this position, and retaining the visor in said storage position by contact between planar surface of said spring and the planar detent surface on the pivot rod shank.

15. A vehicular sun visor assembly comprising:
a core member;
a socket located in said core member, said socket having spaced apart being portions and a spring receiving cavity between said bearing portions;
a pivot rod having a cylindrical shank received in the bearing portions of said socket for pivoting said visor assembly between a storage position adjacent the vehicle roof and a substantially vertical use position, said pivot rod having a planar detent surface portion on the cylindrical shank between said bearing portions; and
a torque spring molded in a resilient plastic being retained in said core member, said torque spring having an oval cross-section with two semicylindrical open ends facing each other and being jointed by tangent legs, and a flat planar wall joining said legs at a skewed angle to define a pivot rod receiving closed perimeter, a semicylindrical end conforming to said cylindrical shank and said flat planar wall conforming to the planar detent surface on said shank which causes a wedging action between the pivot rod shank and said torque spring providing a preloaded force keeping the visor assembly in the position to which it is pivoted and, urging the visor into its storage position as it is being pivoted to this position, and retaining the visor in said storage position by contact between the flat planar wall of said spring and the planar detent surface on the pivot rod shank.

* * * * *